H. D. POWNALL.
ICE MACHINE.
APPLICATION FILED NOV. 15, 1909.

959,602.

Patented May 31, 1910.

2 SHEETS—SHEET 1.

Witnesses
W. Thornton Bogert
C. R. Kropf

Inventor
Henry D. Pownall
By C. W. Miles.
Attorney

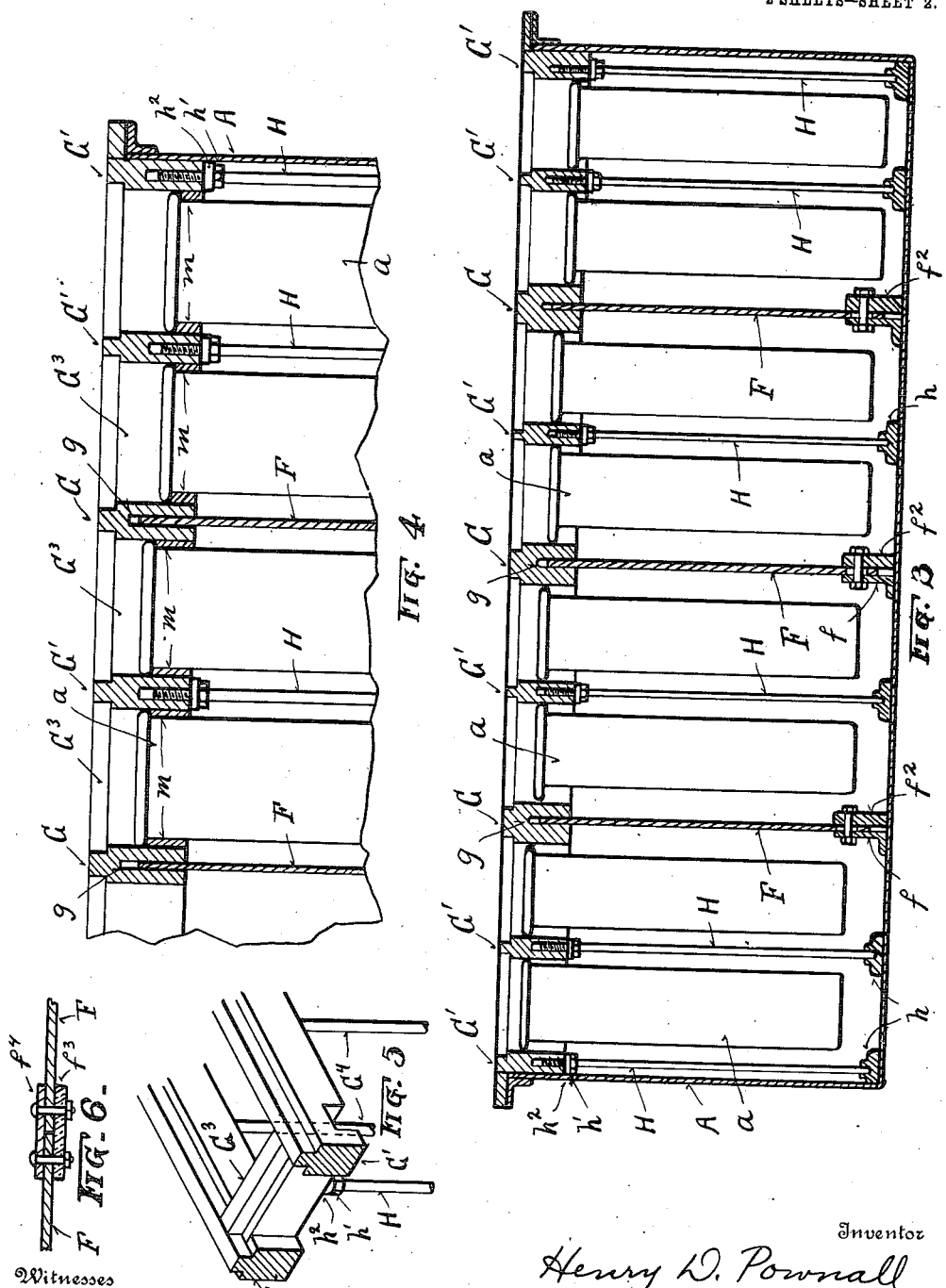

UNITED STATES PATENT OFFICE.

HENRY D. POWNALL, OF CINCINNATI, OHIO.

ICE-MACHINE.

959,602.

Specification of Letters Patent.   Patented May 31, 1910.

Application filed November 15, 1909. Serial No. 528,047.

*To all whom it may concern:*

Be it known that I, HENRY D. POWNALL, a citizen of the United States, residing at Cincinnati, in the county of Hamilton and State of Ohio, have invented certain new and useful Improvements in Ice-Machines, of which the following is a specification.

My invention relates to improvements in ice machines.

One of its objects is to provide an improved brine tank and can supporting means adapted to the rapid circulation of brine therein whereby a uniform temperature may be maintained in all parts of the brine.

Another object is to provide improved means to adjust the top or covering of the brine tank to a uniform or any desired height above the brine.

Another object is to provide improved means in the construction of the top of the brine tank and its supports, and the partitions in the brine tank, whereby a uniform rate of circulation can be maintained in the various parts of the brine tank, and the top adjusted.

Figure 1:
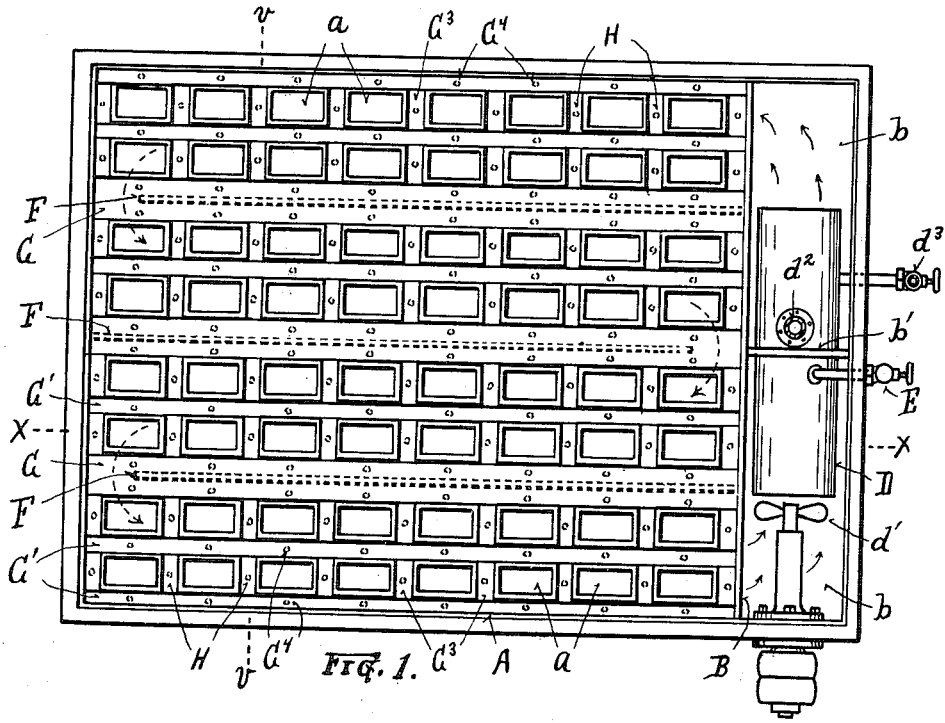
Figure 2:
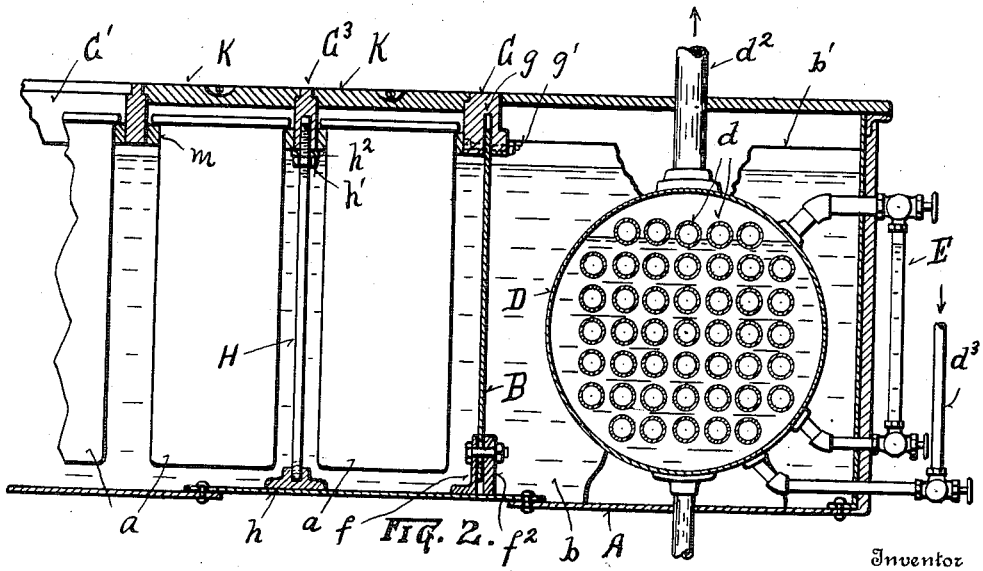

It further consists in certain details of form, combination and arrangement, all of which will be more fully set forth in the description of the accompanying drawings, in which:

Figure 1 is a top plan diagram of my improved brine tank, circulating and cooling apparatus with the ice can lids omitted. Fig. 2 is an enlarged vertical section through the same on line $x$ $x$ of Fig. 1. Fig. 3 is an enlarged vertical section through the same on line $v$ $v$ of Fig. 1. Fig. 4 is a view similar to Fig. 3 illustrating a modification. Fig. 5 is a detail perspective view of a section of the top frame. Fig. 6 is a detail horizontal sectional view of a vertical joint in the partition plate.

In the accompanying drawings A represents a brine tank of an ice machine adapted to receive a series of cans $a$ containing fresh water for the purpose of making ice. In its preferred form the tank A is provided with a partition B forming a compartment $b$ at one end of the tank, in which compartment is preferably mounted a receptacle D having a series of tubes or flues $d$ through which the brine from the brine tank is rapidly circulated by means of propeller blades $d'$, the receptacle D being nearly full of liquefied gas, and the gas or vapor products arising therefrom being removed, preferably by a compressor as soon as formed, through the off-take pipe $d^2$. Liquefied gas is supplied to the receptacle D through the inlet pipe $d^3$.

E represents a liquid gage to indicate the height of the liquefied gas in the receptacle D.

F represents a series of partitions dividing that portion of the brine tank in which the cans are located so as to cause the brine to flow through a loop shaped channel or course from one end of the compartment $b$ to the opposite end thereof one or more times and thence through the tubes of the cooling receptacle D. The partition B is preferably perforated at opposite ends to permit the flow of brine to and from the same, and a partition $b'$ prevents the brine flowing along the outside of the cooling receptacle D.

In practice I desire to have as little resistance to the flow of brine as possible, and to circulate large volumes of brine with considerable rapidity and in such manner as to secure a uniform rate of flow at the surfaces of the respective cans. In attaining these results the cans oppose a considerable resistance to the flow of brine, and hence the level of the brine is greater in some portions of the tank than in others. It is therefore desired to provide means to adjust and support the cans against the action of the brine current, and in different portions of the tank at different levels, depending upon the height of the brine; to provide tight partitions to prevent a short circuiting of the brine current; to locate the partition equidistant from the can rows at opposite sides thereof, and to adjustably support the top of the brine tank so that the same may be adjusted to the desired height above the brine, and maintained at a true level irrespective of inequalities in surface at the bottom of the brine tank, caused by overlapping the composing sheets, and to buckling of said sheets.

In order to attain the above results I provide sheet metal partition plates which are supported relative to and slightly above the bottom of the tank by means of angle plates or brackets $f$. The joints between the partition plates B and F and the bottom of the tank A are made tight by means of boards or like material $f^2$ carefully trimmed to fit the inequalities of the bottom of the tank and bolted to the partition plates. The sills G above the partition plates and forming part of the top and which serve to support the can lids are recessed on their under sides at g to receive the upper edges of the partition plates, which have slotted openings through which bolts g' pass, and may be tightened to clamp the sills upon the partition plates after said sills have been adjusted to the desired height. Vertical joints in the partition plates are formed by butting the edges and clamping by means of a piece of wood $f^3$ on one side, and a metal plate $f^4$ upon the opposite side as indicated in Fig. 6. When thus arranged the partition plates are readily made with tight joints, and are located midway between the rows of cans to secure a uniform rate in the flow of brine, between the partition and cans at each side thereof and a consequent uniform freezing in the cans. The sills G' intermediate of the partitions may be adjustably supported upon rods or sections of pipe H, which at their lower ends are seated in socket plates $h$ seated on the bottom of the tank A. The upper ends of the rods H being threaded and seated in recesses in the under side of the sills G'. Nuts $h'$ and washers $h^2$ serve to support and adjust the sills G' to the desired height, and in connection with the adjustment of the sills G upon the partition plates to secure and maintain the top of the tank at a uniform height or level. I prefer, however, to support the sills G G' by means of short cross sills $G^3$ which are recessed into the under sides of sills G G' and are in turn supported from the bottom of the tank by pipe sections H, as before described. The rods or pipes H beneath the sills $G^3$ serve to support the cans in a vertical position against the action of the brine current. Similar rods H may be employed in addition under the sills G', but I prefer to employ rods $G^4$ projecting downwardly from the sills G G' about half way to the bottom of the tank to support the cans at the sides. When so supported the cans are preferably permitted to float in the brine and to automatically accommodate themselves to the level of the brine in different portions of the tank as indicated in Fig. 3 being maintained by said supports in a vertical position, or prevented from tipping in any direction, and yet free to rise and fall or accommodate themselves to the brine level. The upper edges of the sills G G' may be recessed at $g^2$ to receive and support the edges of the can lids K.

In the modification Fig. 4 the cans are shown supported at varying heights by means of strips $m$ secured to opposite sides of the sills G G', which strips engage and support the enlarged rims at the top of the cans.

The structure herein illustrated and described is capable of considerable modification without departing from the principle of my invention.

Having described my invention, what I claim is:

1. In combination with the brine tank of an ice machine, a vertical partition plate secured to the bottom of the tank, a member forming a close joint between the tank and said partition plate, and a sill recessed on its under side to receive the upper edge of said partition plate, said sill being adjustable relative to said plate.

2. In combination with an ice machine brine tank a vertical partition plate, secured to the bottom of said tank, and an adjustable sill recessed on its under side to receive the upper edge of said partition plate.

3. In combination with an ice machine brine tank a vertical partition plate secured to the bottom of said tank, a member clamped in position to form a close joint between said partition plate and tank, a sill recessed on its under side to receive the upper edge of said partition plate, and means to adjust said sill relative to said plate.

4. In combination with an ice machine brine tank a vertical partition dividing said tank into a loop shaped circulating channel, a brine cooling member included in said circulating channel, brine circulating mechanism, and a top for said brine tank comprising a series of sills adjustably supported relative to said tank, and a series of can lids supported upon said sills.

5. In combination with an ice machine brine tank, a vertical partition dividing said tank into a loop shaped circulating channel, brine circulating mechanism, a series of sills adjustably supported above said tank at intervals apart depending upon the dimensions of the ice cans, said sills being adapted to support a series of can lids.

6. In combination with an ice machine brine tank a brine cooling member immersed in the brine in said tank, a partition dividing said cooling member from the portion of the tank in which the cans are located, a partition in the portion of the tank in which the cans are located dividing the tank into a loop shaped circulating channel, a brine circulating member, a series of cans arranged in said circulating channel with uniform passages between said cans and between said cans and the partition and tank walls, whereby the brine is caused to flow at a uniform rate in all parts of the portion of the tank in which the cans are located.

7. In an ice machine, a brine tank, a partition dividing said tank into a loop shaped circulating channel, a brine circulating member, a brine cooling member included in said circulating channel, a series of sills adjustably supported above said tank by means of supports resting on the bottom of said tank, a series of ice cans arranged in the brine in said circulating channel at progressively lower levels in the direction of the brine current.

8. In an ice machine a brine tank, a partition dividing said tank into a loop shaped circulating channel, a brine circulating member, a brine cooling member included in said circulating channel, a series of sills adjustably supported above said tank, a series of ice cans adapted to be nearly submerged and floating in the brine in said circulating channel, and lateral supports to support said cans in vertical position within said tank.

9. In an ice machine, a brine tank a series of vertical partition plates secured to the bottom of said tank, adjustable sills recessed on their under side to receive the upper edges of said partition plates.

10. In an ice machine a brine tank, divided by a partition into a loop shaped circulating channel, a brine cooling member included in the path of circulation, a brine circulating member, a top for said tank composed of sills and cross sills forming openings for the introduction of the ice cans, said top being adjustably supported relative to the tank by means of supports projecting from the bottom of the tank to said top, a series of ice cans adapted to be nearly submerged and floating in brine, said supports for the top of the tank serving as lateral supports for said cans to hold the cans in a vertical position and permit them to adjust themselves vertically to correspond with variations in the height of the brine at different points in the circulating channel.

11. In an ice machine, a brine tank, a partition dividing said tank into a loop shaped circulating channel, a brine cooling member included in the path of circulation, a brine circulating member, a series of ice cans adapted to float in a nearly submerged condition in the brine of said circulating channel, and means to support said cans laterally to retain them in an upright position, said cans being free to move vertically to accommodate themselves to variations in the height of the brine in said circulating channel.

In testimony whereof I have affixed my signature in presence of two witnesses.

HENRY D. POWNALL.

Witnesses:
WALTER F. MURRAY,
C. W. MILES.